July 14, 1970     A. FISCHER     3,520,044

CUTTER CONSTRUCTION

Filed June 14, 1968

*INVENTOR:*
A. Fischer
*ATTORNEY:*

United States Patent Office 3,520,044
Patented July 14, 1970

3,520,044
CUTTER CONSTRUCTION
Alois Fischer, Friedrichshafen, Germany, assignor to Zahnradfabrik Friedrichshafen, Aktiengesellschaft, Friedrichshafen, Germany
Filed June 14, 1968, Ser. No. 737,039
Claims priority, application Germany, July 7, 1967,
Z 12,942
Int. Cl. B26d 1/12
U.S. Cl. 29—105    5 Claims

ABSTRACT OF THE DISCLOSURE

The invention relates to circular cutters having a plurality of teeth radially arranged wherein each tooth has cutting surfaces comprised of flanks having a plurality of arcuate cutting edges. Such tools are used for the fine shaving of metal in the making of precision parts or gears and the like. The principal feature of the invention resides in eliminating the usual costly method of making such cutters by utilizing tooth members which are set into a support ring and peripherally spaced in grooves previously cut radially into the ring. Thus the machining of the ring is a relatively simple matter and each of the teeth can be provided with flanks having a plurality of shaving edges much more readily prior to being made integral with the ring than is possible with presently known methods of making such tools.

---

Shaving cutters of the kind described herein are not strictly new but the prior art produces such cutters by cutting deep slots in the periphery of a ring and literally carving the individual teeth out of the material of the ring. Thereafter the flanks of the teeth are grooved to provide cutting edges between grooves. All of this procedure is very time consuming and quite costly when compared with the present invention as will be apparent.

Briefly, the invention contemplates the provision of a cutter of the class described which is comprised of a support ring having a plurality of slots cut therein, each slot accommodating an insertable tooth. Each tooth has opposed flanks grooved and edged for cutting purposes and can be permanently bonded in the respective slots as by welding, hard soldering, or cemented by synthetic resin adhesives. Additionally retainer rings may be bolted to the sides of a support ring to insure against longitudinal slippage of the teeth.

Thus, the support ring can be made of relatively inexpensive carbon steel and only the individual teeth made of high grade tool steel thus minimizing material cost in addition to minimizing the considerable work necessary to cut a large plurality of teeth from an integral ring of hard tool steel. Owing to the minimum usage of tooth material, it is possible to use special extremely hard materials which yield better cutting qualities and considerably longer life. Further, in the event of damage to any one tooth, only that tooth need be replaced.

While toothed hobs with inserted cutting teeth have heretofore been known, when used for roughing they must absorb considerable cutting pressure. However, in the case of a cutter as in the present invention, used for light shaving strokes, the teeth are not under a very heavy load and hence securing the teeth to the support ring can be accomplished in a variety of ways which would not be practical for conventional hobs.

Figure 2:
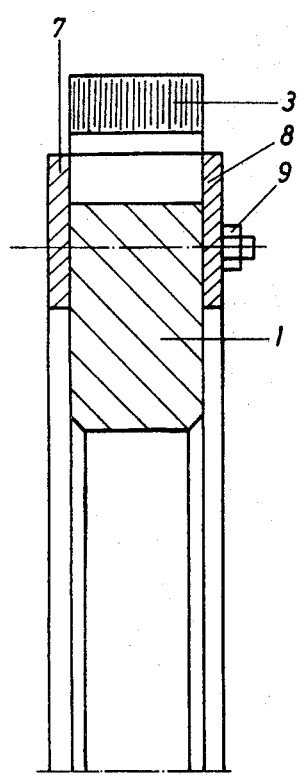
Figure 1:
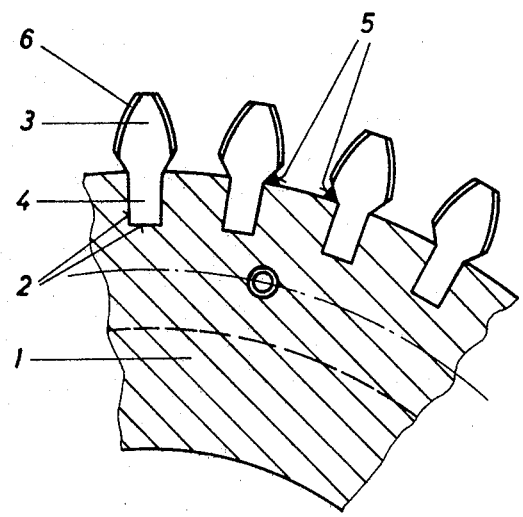
Figure 1:
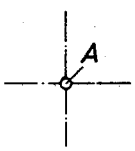

A detailed description of the invention now follows in conjunction with the appended drawing in which:

FIG. 1 is a fragmentary radial section through a circular cutter of the invention, and FIG. 2 is a section taken longitudinally and fragmentarily, showing a single tooth in position on the support ring.

Referring to the drawing, the invention comprises a support ring 1 into which has been peripherally cut a plurality of slots or grooves 2, all radial with respect to the axis A. Alternatively, the grooves may run slightly oblique in relation to that axis. In each of the grooves there is a cutting tooth 3 having shank 4 inserted so as to smoothly fit the respective groove. Each tooth can be secured as by welding, soldering, or synthetic adhesive seams, indicated at 5, in the undercut provided at the juncture of tooth body and shank adjacent ring 1.

Prior to the insertion of the teeth in the ring they are suitably milled and grooved so as to be provided with cutting of shaving edges 6. Subsequent to insertion of the teeth the cutting edges 6 may be sharpened.

The teeth may also be secured in the wheel by shrinking the shanks before the teeth are inserted into the grooves, as will be apparent to persons skilled in the art or force fit methods may be used.

Where a cutter is intended to meet practice conditions requiring frequent exchangeability of teeth, the teeth can be secured as by shrinking or force fit and retained against longitudinal shifting by retainer rings 7 and 8 secured as by bolt and nut devices 9 to the support ring 1.

I claim:
1. A cutter of the class described comprising a support ring having a plurality of peripheral grooves and a cutter tooth in each said groove having a shank secured therein, each said tooth being provided with a flank having a plurality of cutting edges in planes normal to the axis of said support ring.

2. A tool is set forth in claim 1 wherein said grooves extend from side to side of said ring.

3. A tool is set forth in claim 2 wherein said teeth are provided with shanks disposed in respective grooves and said teeth are undercut in the areas adjacent said shanks, and seam of securing material disposed in said undercuts to secure said teeth to said support ring.

4. A tool is set forth in claim 2 said teeth having shanks effecting a frictional grip within respective grooves.

5. A tool is set forth in claim 4 including retaining rings secured to the sides of said support ring and retaining said teeth against longitudinal shifting.

References Cited
UNITED STATES PATENTS

| | | | |
|---|---|---|---|
| 836,515 | 5/1909 | Jude | 29—105 X |
| 2,167,146 | 7/1939 | Drader | 90—1.6 |
| 2,305,145 | 12/1942 | Dalzen | 29—103 |
| 2,667,090 | 1/1954 | Martin | 90—1.6 X |
| 2,682,100 | 6/1954 | Phelprex | 29—105 |
| 3,175,275 | 3/1965 | Zorn | 29—105 |
| 3,213,576 | 10/1965 | Williams | 29—105 |

HARRISON L. HINSON, Primary Examiner